United States Patent [19]
Kirk et al.

[11] Patent Number: 5,497,248
[45] Date of Patent: Mar. 5, 1996

[54] METHOD AND APPARATUS FOR VIEWING SCREENED IMAGES

[75] Inventors: Richard A. Kirk; Malcolm D. M. Roe, both of Hertfordshire, England

[73] Assignee: Crosfield Electronics Limited, Hertfordshire, England

[21] Appl. No.: 949,150

[22] Filed: Sep. 23, 1992

[30] Foreign Application Priority Data

Oct. 18, 1991 [GB] United Kingdom ............... 9122154

[51] Int. Cl.[6] .................................................. G03F 1/00
[52] U.S. Cl. .......................... 358/454; 358/450; 358/456
[58] Field of Search .................................. 358/454–460, 358/298, 354, 536, 382, 450–453

[56] References Cited

U.S. PATENT DOCUMENTS

| | | | |
|---|---|---|---|
| 3,629,493 | 11/1969 | Morgenfruh | 178/6 |
| 4,639,770 | 1/1987 | Jung et al. | 358/76 |
| 5,055,941 | 10/1991 | Suzuki et al. | 358/450 |
| 5,276,535 | 1/1994 | Levian | 358/456 |

FOREIGN PATENT DOCUMENTS

| | | |
|---|---|---|
| 0047145 | 3/1982 | European Pat. Off. . |
| 0147813 | 7/1985 | European Pat. Off. . |
| 0246010 | 11/1987 | European Pat. Off. . |

OTHER PUBLICATIONS

European Search Report.

*Primary Examiner*—Bernard Roskoski
*Attorney, Agent, or Firm*—Sughrue, Mion, Zinn, Macpeak & Seas

[57] ABSTRACT

A method and apparatus for viewing the effect of outputting on the output device an image represented by digital data defining the colour content of pixels of the image. The apparatus comprises a monitor; a store; and a processor to enable a portion of the image to be selected, and for generating and storing in the store data simulating the selected image portion as it would appear after screening by the output device. The monitor is responsive to the stored data to display the simulated, screened image portion.

7 Claims, 2 Drawing Sheets

METHOD AND APPARATUS FOR VIEWING SCREENED IMAGES

The invention relates to image processing in particular in the printing industry where coloured images are printed after generating screened colour separations. It is well known that the screening process can lead to the generation of moire and other undesirable effects which only become apparent when the image has been scanned out to film. It is often too late then to effect any changes in screen angles or frequencies. If changes have to be made to the screen angles or screen frequencies time and money are wasted.

SUMMARY OF THE INVENTION

In accordance with one aspect of the present invention, we provide a method of viewing on a monitor the effect of outputting an image represented by digital data defining the colour content of pixels of the image on an output device after screening. The method includes the steps of:

a) selecting a portion of the image;

b) generating data simulating half-tone dots representing the selected image portion as it would appear after screening by the output device, the half-tone dots being defined by sets of half-tone dot pixels; and, c) displaying the simulated, screened image portion on a monitor.

In accordance with a second aspect of the present invention, apparatus for viewing the effect of outputting on an output device an image represented by digital data defining the colour content of pixels of the image comprises a monitor; a store; and processing means to enable a portion of the image to be selected, and for generating and storing in the store data simulating the selected image portion as it would appear after screening by the output device; the monitor being responsive to the stored data to display the simulated, screened image portion.

We have devised a method and apparatus which enables the effects of screening to be viewed on a monitor without the need to produce a colour proof on an output device such as a colour printer or output separation scanner. In particular, where the selected portion is relatively small, it is possible to select and display a portion of the image after screening very quickly and thus the effect of previously set screening parameters can be viewed and if necessary altered and the same portion redisplayed under the control of the new screening parameters.

Half-tone dot pixels (that is the smallest element that will be exposed by the output device) could be displayed at one per raster line of the monitor display or alternatively the resolution of the half-tone dot pixels could be reduced, for example by low pass filtering and sub-sampling prior to display. In general, one image pixel will correspond to a number of half-tone dot pixels.

The method of generating screened data can be of any conventional type and can be used to generate either hard (binary) dots or soft edged dots. For hard dots represented at full resolution on the monitor the colour conversion is particularly simple. There are only 16 ways of overprinting four separations, so the image could be represented by a palette of 16 colours. For soft edged dots or averaged and resized images we can have intermediate levels in all four channels, and the colour conversion to monitor RGB must be correspondingly more complex.

The processing means may comprise a suitably programmed computer or a hardware arrangement or a combination of the two.

Preferably, the half-tone dot pixels of the simulated screened image are displayed overlying a display of the original image in a region centred on the selected portion. A technique similar to that described in EP-A-0246010 can be used to achieve this.

BRIEF DESCRIPTION OF THE DRAWINGS

Some examples of methods and apparatus according to the present invention will now be described with reference to the accompanying drawings, in which.

DETAILED DESCRIPTION OF THE EMBODIMENTS

Figure 1:
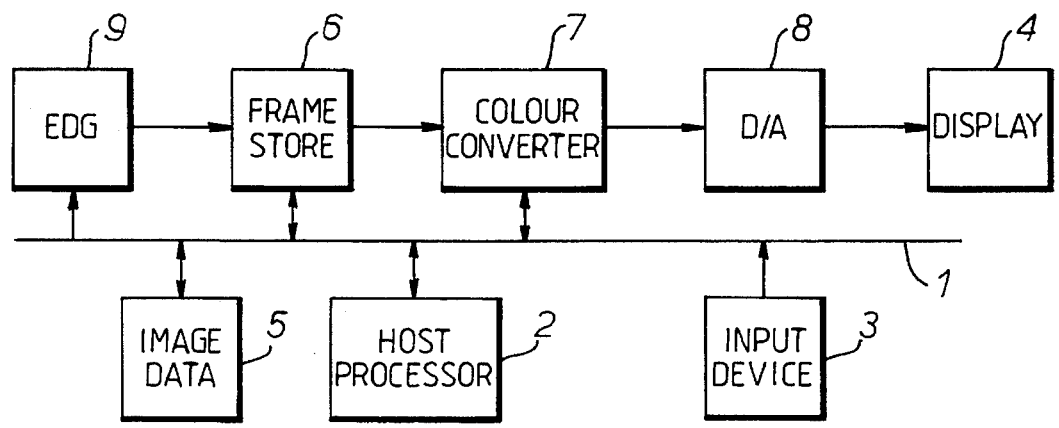
FIG. 1 is a schematic, block diagram of a first example of the apparatus.

The apparatus shown in FIG. 1 comprises a system bus 1 coupled to a microprocessor 2, an input device such as digitizing table or keyboard 3, and a monitor 4. An image store 5 is coupled to the bus 1 and stores digital data defining the colour content of pixels of an image. This digital data will define the cyan, magenta, yellow and black (CMYK) components of the image and will have been generated either electronically or by scanning an original image using a conventional electronic scanner.

As in a conventional work station, the apparatus also includes a frame store 6 coupled to the bus 1, a colour converter 7 for converting, in this example cyan, magenta, yellow and black (CMYK) colour components to red, green and blue (RGB) and a digital-to-analogue converter 8 coupled between the colour converter 7 and the display 4. In such a typical work station the operator indicates to the microprocessor 2 via the input device 3 part of an image which he wishes to display. Digital data defining that image part is accessed from the image data store 5 and loaded via the system bus 1 into the frame store 6. The image data is then converted to display RGB by the colour converter 7 and displayed on the display 4 via the D/A converter 8. The colour converter 7 may be a palette look-up table or a full CMYK to RGB converter.

The work station shown in FIG. 1 has been modified by the inclusion of an electronic dot generator circuit (EDG) 9 coupled to the bus 1.

Figure 2:
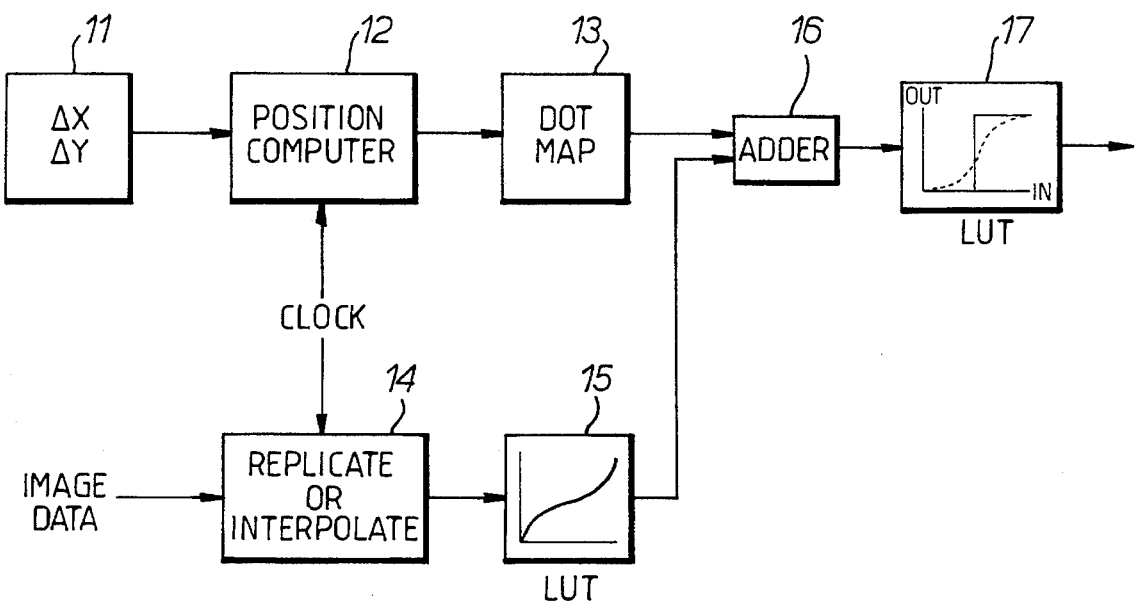
FIG. 2 is a block diagram of part of the electronic dot generator shown in FIG. 1; and, FIGS. 3 and 4 are schematic, block diagrams similar to FIG. 1 of second and third examples.

The EDG 9 has four channels, one for each of the colour components CMYK, one of the channels being shown in FIG. 2. This channel includes an X, Y increment store 11 which supplies X, Y increments ΔX, ΔY to a position computer 12 which computes the next dot pixel whose content is to be computed. This address information is then fed to a dot map 13 containing threshold data. Image data from the store 5 is fed to a replicate or interpolate circuit 14 which replicates or interpolates the incoming data to dot pixel resolution. The pixel data is output from the circuit 14 to a square law look-up table 15 and the threshold information and the pixel information from the dot map 13 and LUT 15 respectively are input to an adder 16 which operates effectively to compare the two values, the result being fed to a look-up table 17 which outputs a value for the dot pixel dependent upon whether the pixel values are greater than or less than the threshold value (in the case of a hard dot) or further modified in the case of a soft dot. The system shown in FIG. 2 may be realised in hardware or software and is described in more detail in EP-A-0047145 which is incorporated herein by reference.

Figure 3:
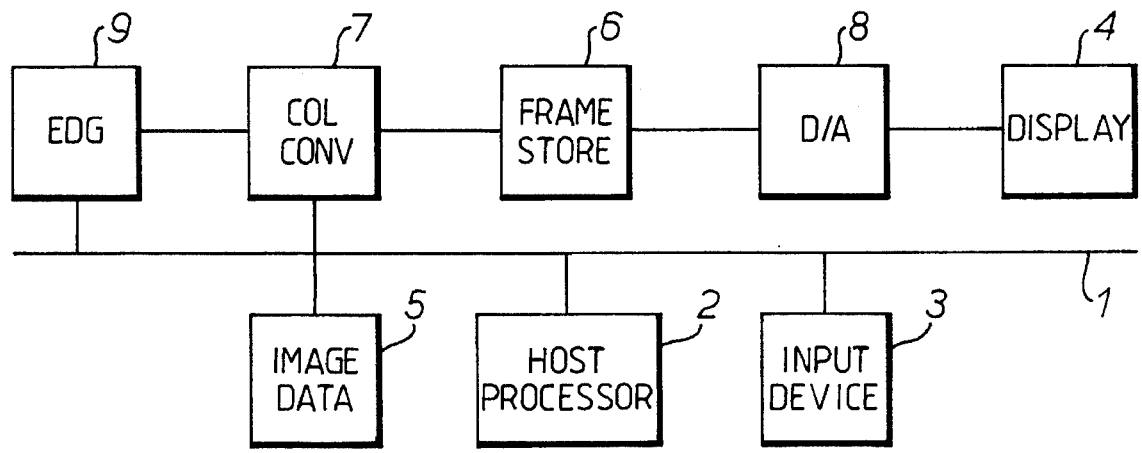

In operation, initially the operator will cause an image to be displayed on the display 4 in a conventional manner and he will then select via the input device 3 a portion of that image which he wishes to view to see the effect of screening. The host processor 2 reads image data from the store 5 corresponding to the selected portion which is then fed to the EDG 9. The EDG 9 then operates on the image pixel data supplied, in a conventional manner as already explained, so that dot pixel data for each of the four channels is output to the frame store 6 where it is stored. Typically, the screened region will be displayed at an enlarged scale using a method similar to that described in EP-A-0246010. Thus, the dot pixel data will be stored in a corresponding set of locations in the frame store 6. FIG. 3 illustrates a modification of the FIG. 1 example for use, for example, where the colour conversion cannot be carried out in real time. In this case, the colour converter 7 is positioned between the EDG 9 and the frame store 6 so that image data from the store 5 and data from the EDG 9 are converted from CMYK to RGB and are then stored in the frame store 6. Otherwise, the arrangement is the same as shown in FIG. 1.

Figure 4:
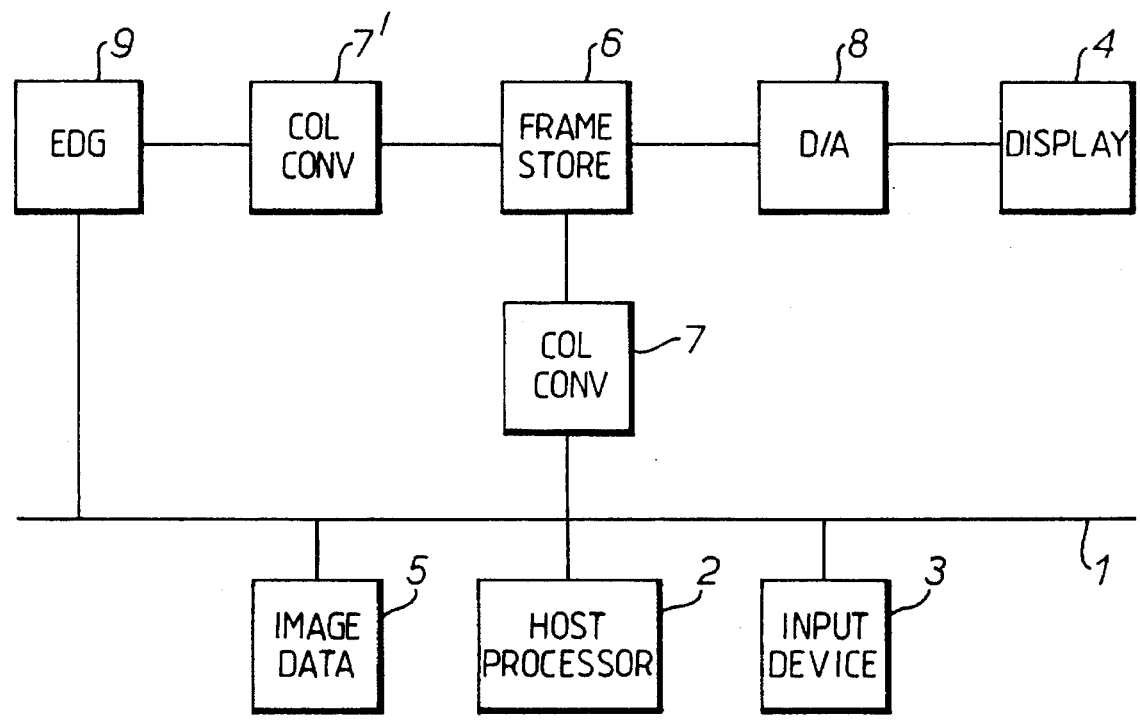

A further example is shown in FIG. 4 in which the frame store 6 stores RGB data obtained from the image data store 5 via the colour converter 7 or from the EDG 9 via the colour converter 7'. Where a hard dot process has been used, the conversion process performed by the colour converter 7' is particularly straight forward. This is because for each of the four colour components, each dot pixel is coded as a zero or one so that when the four values (0 or 1) for each colour component of a half-tone dot pixel are combined, one of only 16 possible values results, thus requiring only a 16 address look-up table within the colour converter 7' to convert to RGB values.

In the simplest case of all the examples, each half-tone dot pixel in the store 6 is displayed, there being one dot pixel per raster line. However, if a less magnified image of the screened data is desired, the operator may wish to reduce the resolution of a half-tone dot pixel representation. This may be done by low pass filtering and subsampling the data before it is displayed. An alternative way of changing the magnification of the screened data is to alter the replicate/interpolate factor in unit 14 and the values of ΔX and ΔY (11) in inverse proportion. In any event, the half-tone dot representation is displayed in a region centred on the centre of the selected image portion, the remainder of the image which is not obscured by the screened display region being displayed normally on the monitor.

The advantage of this invention is that by selecting only a small portion of the image to be displayed after screening, the screening algorithm can be performed very quickly, for example in less than one second, and the screened version displayed. If the operator is not satisfied with the screened version as displayed then he can instruct the processor 2 to change the screening parameters, for example screen angle or screen spacing, and then repeat the process.

In some cases, if the EDG 9 can operate sufficiently quickly, it could be placed between the frame store 6 and the colour converter 7.

We claim:
1. A method of viewing on a monitor the effect of outputting on an output device, screened colour separations which overlie each other to generate a coloured image, each of said screened colour separations being represented by digital data defining a respective colour component content of pixels of the image, the method comprising a) selecting a part of said coloured image;

b) generating from said digital data, data simulating half-tone dots representing a portion of each of said screened colour separations corresponding to said selected coloured image part as it would appear after screening by said output device, said half-tone dots being defined by sets of half-tone dot pixels; and, c) combining data defining said colour separation portions to generate combined data simulating the effect of overlying said colour separation portions; and controlling a monitor in response to said combined data to display a simulation of said selected coloured image part on said monitor.

2. A method according to claim 1, wherein said half-tone dot pixels are displayed at reduced resolution by low pass filtering and sub-sampling prior to display.

3. A method according to claim 1, wherein said step b) generates hard dots in which each half-tone dot pixel is defined by one binary digit for each colour component.

4. A method according to claim 1, wherein said step c) comprises displaying said half-tone dot pixels of the simulated screened image overlying a display of the original image in a region centred on the selected portion.

5. Apparatus for viewing the effect of outputting on an output device, screened colour separations which overlie each other to generate a coloured image, each of said screened colour separations being represented by digital data defining a respective colour component content of pixels of the coloured image, the apparatus comprising:

a monitor;

a store; and processing means to enable a part of said coloured image to be selected, for generating from said digital data and for storing in said store, data simulating half-tone dots representing the portion of each of said screened colour separations corresponding to said selected coloured image part as it would appear after screening by the output device, and for combining data defining said colour separation portions to generate combined data simulating the effect of overlying said colour separation portions; the monitor being responsive to the combined data to display a simulation of said selected screened coloured image part.

6. Apparatus according to claim 5, wherein said processing means comprises a suitably programmed computer.

7. Apparatus according to claim 5, wherein said processing means includes an electronic dot generator whose output is connected to said store.

\* \* \* \* \*